(12) United States Patent
Stepura et al.

(10) Patent No.: US 12,492,023 B1
(45) Date of Patent: Dec. 9, 2025

(54) CATAPULT LAUNCHER FOR A FIXED-WING UNMANNED AERIAL VEHICLE (UAV)

(71) Applicant: Oleksandr Stepura, Kyivska oblast (UA)

(72) Inventors: Oleksandr Stepura, Kyivska oblast (UA); Volodymyr Stepura, Kyivska oblast (UA)

(73) Assignee: Oleksandr Stepura, Kyivska oblast (UA)

( * ) Notice: Subject to any disclaimer, the term of this patent is extended or adjusted under 35 U.S.C. 154(b) by 0 days.

(21) Appl. No.: 19/231,778

(22) Filed: Jun. 9, 2025

(30) Foreign Application Priority Data

Jun. 7, 2024  (UA) .............................. a 2024 03027

(51) Int. Cl.
*B64U 70/70* (2023.01)
(52) U.S. Cl.
CPC ................................... *B64U 70/70* (2023.01)
(58) Field of Classification Search
CPC . B64U 70/70; B64U 10/25; B64F 1/06; F41F 3/0406
See application file for complete search history.

(56) References Cited

U.S. PATENT DOCUMENTS

| | | | | | |
|---|---|---|---|---|---|
| 1,960,264 | A | * | 5/1934 | Heinkel | B64F 1/06 244/63 |
| 2,672,306 | A | * | 3/1954 | Doolittle | B64F 1/06 104/173.1 |
| 2,953,065 | A | * | 9/1960 | Brown | B64F 1/06 89/1.819 |
| 3,520,502 | A | * | 7/1970 | Smethers, Jr. | B64D 5/00 104/103 |
| 3,968,947 | A | * | 7/1976 | Schlegel | B64F 1/06 244/63 |

(Continued)

*Primary Examiner* — Medhat Badawi
(74) *Attorney, Agent, or Firm* — SALIWANCHIK, LLOYD & EISENSCHENK

(57) ABSTRACT

The claimed invention discloses a catapult launcher for a fixed-wing unmanned aerial vehicle (UAV), the launcher comprises a starting rail having an I-beam cross-section that comprises two sections that are foldable/unfoldable and mounted on adjustable supports, a carriage that is equipped with wheels that are configured to interact with an internal surface and with an external surface of the starting rail and that is equipped with a UAV interaction mechanism that is represented by fasteners and joint elements that interact with adapters that are fixed to a UAV's fuselage and made in a form of two plates, and a lower edge of the plates is produced with grooves so as to enable interaction with the fasteners and with detents in a form of hooks that are tangent to joint elements. The launcher is equipped with elastic cords that are symmetrically arranged along the starting rail and fixed to the carriage and to the starting rail, and with a release device. A beginning of the starting rail is provided with an inclined section, and the release device joins to the carriage on the inclined section and the carriage to the UAV, their reliable fixation and start of the carriage movement upon activation of the release device. This configuration ensures reliability and portability of the launcher as well as a safe UAV launch at a short acceleration distance.

7 Claims, 11 Drawing Sheets

(56) References Cited

U.S. PATENT DOCUMENTS

| | | | | |
|---|---|---|---|---|
| 4,079,901 A * | 3/1978 | Mayhew | B64F 1/06 | 124/36 |
| 4,238,093 A * | 12/1980 | Siegel | B64F 1/06 | 244/63 |
| 4,530,476 A * | 7/1985 | Thurber, Jr | B64U 30/12 | 89/1.801 |
| 4,678,143 A * | 7/1987 | Griffin | B64F 1/06 | 244/63 |
| 6,457,673 B1 * | 10/2002 | Miller | B64F 1/06 | 244/63 |
| 6,626,399 B2 * | 9/2003 | Young | A63H 27/14 | 446/65 |
| 6,851,647 B1 * | 2/2005 | Rosenbaum | B64F 1/06 | 244/63 |
| 7,090,166 B2 * | 8/2006 | Dennis | B64F 1/06 | 244/63 |
| 7,140,575 B2 * | 11/2006 | McGeer | B64F 1/06 | 244/63 |
| 7,143,974 B2 * | 12/2006 | Roeseler | B64U 70/70 | 244/63 |
| 7,165,745 B2 * | 1/2007 | McGeer | B64F 1/06 | 244/114 R |
| 7,210,654 B1 * | 5/2007 | Cox | B64U 70/70 | 244/190 |
| 7,954,755 B2 * | 6/2011 | Lipponen | F41B 3/02 | 244/63 |
| 9,010,693 B1 * | 4/2015 | Barbieri | B64C 3/54 | 244/218 |
| 9,079,671 B2 * | 7/2015 | Endres | B64F 1/06 | |
| 9,156,564 B2 * | 10/2015 | Endres | B64F 1/06 | |
| 9,783,322 B2 * | 10/2017 | Tully | B64F 1/08 | |
| 9,862,505 B2 * | 1/2018 | Wallace | B64U 10/00 | |
| 9,969,504 B1 * | 5/2018 | Davis | B64U 70/70 | |
| 10,118,713 B2 * | 11/2018 | Tully | B64F 1/08 | |
| 10,370,120 B1 * | 8/2019 | McGann | B64F 1/06 | |
| 10,370,121 B1 * | 8/2019 | McGann | B64U 70/70 | |
| 10,377,504 B2 * | 8/2019 | Hoffstadt | B64F 1/02 | |
| 10,518,903 B2 * | 12/2019 | Sirvis | B64F 1/06 | |
| 11,591,112 B2 * | 2/2023 | Stepura | B64F 1/06 | |
| 11,628,952 B1 * | 4/2023 | Wright | B64F 1/06 | 244/63 |
| 11,787,561 B2 * | 10/2023 | Brown | B64U 70/70 | 244/63 |
| 12,227,319 B1 * | 2/2025 | Grondin | B64U 70/70 | |
| 2003/0116677 A1 * | 6/2003 | Young | A63H 27/14 | 244/63 |
| 2004/0232282 A1 * | 11/2004 | Dennis | B64F 1/06 | 244/110 E |
| 2006/0086349 A1 * | 4/2006 | Kamen | F41B 7/00 | 124/71 |
| 2008/0203220 A1 * | 8/2008 | Hanzlick | B64U 70/70 | 244/63 |
| 2012/0012695 A1 * | 1/2012 | Robinson | B64F 1/06 | 244/63 |
| 2012/0080556 A1 * | 4/2012 | Root, Jr. | B64F 1/06 | 73/170.28 |
| 2013/0277497 A1 * | 10/2013 | Jones | B64F 1/06 | 244/63 |
| 2016/0114906 A1 * | 4/2016 | McGeer | B64F 1/06 | 244/114 R |
| 2016/0355261 A1 * | 12/2016 | Chin | B64U 70/20 | |
| 2017/0297740 A1 * | 10/2017 | Lipponen | B64F 1/06 | |
| 2017/0313442 A1 * | 11/2017 | Sirvis | B64F 1/06 | |
| 2018/0101169 A1 * | 4/2018 | Applewhite | G08G 5/55 | |
| 2018/0141659 A1 * | 5/2018 | Sher | B64U 20/65 | |
| 2018/0244402 A1 * | 8/2018 | Kahlon | B64U 70/50 | |
| 2021/0347499 A1 * | 11/2021 | Bi | B64U 70/70 | |
| 2022/0219814 A1 * | 7/2022 | Benedict | B64C 27/59 | |
| 2022/0234755 A1 * | 7/2022 | Demonfort | B64U 80/86 | |
| 2022/0258884 A1 * | 8/2022 | Stepura | B64F 1/029 | |
| 2022/0332434 A1 * | 10/2022 | Brown | B64U 70/70 | |
| 2025/0135817 A1 * | 5/2025 | Baker | B64C 9/02 | |
| 2025/0162738 A1 * | 5/2025 | Gautier | B64U 70/50 | |
| 2025/0197039 A1 * | 6/2025 | Gautier | F41F 7/00 | |

* cited by examiner

CATAPULT LAUNCHER FOR A FIXED-WING UNMANNED AERIAL VEHICLE (UAV)

CROSS-REFERENCE TO RELATED APPLICATION

This application claims priority to Ukrainian Application No. a 2024 03027, filed Jun. 7, 2024, which is hereby incorporated by reference in its entirety.

FIELD OF THE INVENTION

The claimed invention relates to a field of unmanned aviation, in particular, to a starting equipment for unmanned aerial vehicles (UAVs), and it relates to an improved catapult system that is intended to ensure a reliable acceleration and launch of the fixed-wing UAV at a short distance.

PRIOR ART

Generally, in order to launch the fixed-wing UAV, rail or track type catapult systems equipped with a carriage are used, while UAV's fuselage interacts with the carriage. The carriage is slidably or rollably mounted on a Starting rail, is connected to a release device and/or to another driving means, e.g., a pulling rope. Although the catapult launch in the field of small aircrafts has been used for a quite long time, the development of the UAV technologies requires to improve launchers as well.

Currently, it is required to create portable launchers that could be easily transported and switched from a non-operating status to an operating status, while involving a low amount of human resources and special tools for providing a reliable and safe UAV launch, which are frequently used for surveillance in the military field.

A U.S. Pat. No. 6,851,647B1 dated Feb. 8, 2005 discloses a portable launcher for small aircrafts, the launcher comprises several interconnected elongated rail tracks made of a rigid material, the tracks form a catapult launcher, a winch system that is connected to the launcher, wherein the winch system is adjusted by a weight suspension as well as comprises a pulling rope and an elastic rope, and a carriage that is slidably mounted on a rail system of the launcher, wherein the carriage is connected to the winch system. An upper part of the carriage comprises elements in a form of hook clamps for providing a temporary abutment for wings and a UAV tail section, and the carriage is moved into a launching position by means of the pulling rope of the winch and started upon activation of its elastic element by a trigger. The portability of the system is ensured by a hinge that provides a longitudinal connection between the rail tracks and a transition of the launcher from an unfolded configuration into a folded configuration. A front bipod that is removably connected to a front section of the rail track is used as supports of the launcher, while the launcher rests on the ground with a rear section of the rail track.

A drawback of said solution is that the launch generally depends on a spring force of the ropes system that is rather difficult to be adjusted for providing the required acceleration of the carriage, thereby requiring to increase the acceleration distance and, thus, to increase dimensions of the launcher. Also, a drawback of said solution is that mounting of the UAV on the carriage in said configuration does not ensure its stability against swinging during acceleration and creates a risk of its incorrect or untimely release during launching.

It is intended to eliminate the latest mentioned drawback by a solution disclosed in a patent U.S. Pat. No. 11,787,561B2 dated Oct. 17, 2023 that describes UAV launching adapters that are fixed to a fuselage for interaction with a launcher carriage. According to the mentioned solution, the launcher for the fixed-wing UAV, the launcher comprises a catapult that is mounted on supports and a carriage that is mounted in a linearly movable fashion on a starting rail of the catapult, while interacting with its release device, interacts with the UAV owing to a system of adapters that is provided on the latter, the adapters are intended to unify the launching regardless of any specific structure of the launcher. However, said launching adapters comprise a set of elements that are adjusted to a certain specific structure of the carriage, and when the UAV releases from the carriage, these elements remain on the carriage that could result in squeezing or even a flick during their disconnection from the elements of the adapters that are fixed on the fuselage.

The closest analogue of the claimed invention that may be chosen is a patent U.S. Pat. No. 10,518,903B2 dated Dec. 31, 2019 that discloses a catapult launcher for fixed-wing UAVs, the launcher comprises several sections to form a longitudinal starting rail. The starting rail is mounted on supports, equipped with an elastic cord and a release device. A carriage is mounted on the rail in a linearly movable fashion, the carriage interacts with the elastic cord and with the release device, and it is equipped with a UAV interaction mechanism. The starting rail is tubular, while forming a compressed gas channel inside, the gas drives a piston that is used as the release device and that, in a combination with the elastic cord, ensures movement of the carriage along a longitudinal axis of the starting rail for launching the UAV. At the same time, the interaction mechanism for providing the interaction between the carriage and the UAV is a guiding channel for abutting a fuselage lower part, rear lever brackets for supporting side parts of a fuselage tail section, and a front lever support for interaction with the side parts of a fuselage nose part that are configured to rotate after the carriage reached a final acceleration point. Therewith, the rear supports and the front supports are equipped with side gaskets, thereby avoiding any sliding of the fuselage during acceleration.

However, this launcher is rather complex to deploy, since it requires special knowledge and servicing tools. Furthermore, a lever action of the support elements for interaction with the UAV requires a precise synchronization of their disconnection from the fuselage that may create a risk of obstacles when the carriage releases during launching.

SUMMARY OF THE INVENTION

The subject invention provides an easy-to-operate portable catapult launcher that eliminates drawbacks of prior versions and ensures synchronization of its elements' interaction at all steps of UAV's launch to provide its reliable retention and smooth release, and while portable, convenient in transportation, and is suitable for quick deployment in field conditions without use of any special tools.

Embodiments provide a launcher for fixed-wing UAVs, the launcher comprising at least two sections that form a longitudinal starting rail that is mounted on supports, the rail is equipped with elastic cords and a release device, a carriage, which is linearly movable, is mounted on the starting rail while interacting with the elastic cords and the release device, and the carriage is equipped with a UAV interaction mechanism.

According to certain embodiments, the starting rail has an I-beam cross-section, four pairs of wheels are mounted in a carriage lower part and configured to interact with vertical surfaces of the starting rail, and the two pairs of wheels are configured to interact with internal horizontal surfaces of the starting rail. Another pair of wheels that is movable vertically and configured to interact with an external surface of the starting rail is mounted in a carriage rear part. This configuration provides the rail with a resistance to significant static and dynamic loads, while ensuring reliable, uniform and comprehensive linear movement of the carriage along it.

In certain embodiments, the beginning of an upper part of the starting rail, there is an inclined section beveled in a launching direction, the inclined section has a hole, and the release device comprises a hook that is configured to detachably engaged with a carriage lower part and to crank into the hole of the inclined section. Therewith, the elastic cords are divided into two parts that are symmetrically arranged along the starting rail, while passing around rollers blocks on its sides, and fixed, with their certain ends, on a carriage front part and fixed, with their other ends, to a rigging bar that is provided on an underside at the beginning of the starting rail.

This configuration ensures a reliable retention of the carriage in its initial position. The carriage is held in the starting zone by means of its connection to the hook of the release device that, upon activation, hides into the formed gap. Then, the carriage starts to move along the starting rail under the action of the elastic cords, and the pair of wheels in the carriage rear part releases from the inclined section. Furthermore, mentioned arrangement of the elastic cords allows to ensure a stoppage of the carriage in a finish zone of the rail without providing it with catching or stoppage means due to conformance of a ratio between a length and an elasticity of the pulling rods and a distance of the block of rollers relative to the starting rail.

The carriage has two side plates with the mechanism installed that interacts with the UAV, the mechanism is represented by fasteners in a form of two spring-loaded rods having free ends that are mounted vertically in upper parts of the plates and other ends that are fixed in a crossbeam that is arranged between the carriage plates and connected to supports of the pair of third wheels, and joint elements that are arranged in upper exposed zones of the carriage plates and consist of rollers pairs that are mounted on transverse axes. Therewith, adapters for the carriage interaction mechanism are fixed on the UAV's fuselage, the adapters are made in a form of two plates. A lower edge of each of the adapter plates is produced with a groove so as to enable interaction with the rod and a detent in a form of a hook having an internal surface and an external surface that are tangent during interaction with joint rollers.

This configuration ensures a reliable fixation of the UAV on the carriage when it is arranged in the starting inclined section, while after lowering of the carriage rear wheels it causes lowering of the crossbeam and the rods, thereby unlocking the UAV on the carriage, while reliably retaining it on the joint elements during acceleration and ensuring its smooth release at the end of the starting rail.

Said structural improvements are intended to achieve a technical effect that lies in providing an effective and safe launch of the UAV at a short acceleration distance, while providing portability and reliability of the launcher.

According to one of possible exemplary embodiments, the starting rail has nodal connections for connecting the sections between each other and for connecting the sections to the supports that are equipped with external fasteners to provide a hinged folding/unfolding and adjustment of supports' positions relative to the sections. This configuration ensures easy deployment of the launcher without use of any special tools and adjustment of its height and incline by changing a mounting angle of the supports, as well as enables its portability during transportation.

According to one of possible exemplary embodiments, a front support is V-shaped and height-adjustable, thereby further facilitating adjustment of a launch angle and adaptation to irregularities of a surface that the launcher is mounted on.

According to another possible exemplary embodiment, the plates of the adapters are perforated in order to reduce their weight and to minimize influence onto the UAV weight, and a length of the plates is at least the same as the length of bars, while a width gradually increases towards the hook, thereby increasing their reliability when interacting with the carriage and avoiding any harmful influence onto the UAV aerodynamics.

Also, according to possible exemplary embodiments, the release device has an electrical drive and/or a mechanical drive that could be easily implemented with traditional means and ensures a reliable activation in both cases. Furthermore, in an exemplary embodiment of the invention, both drives may be present, where the mechanical drive is a spare drive if there is no power supply.

According to another exemplary embodiment of the invention, the elastic cords are a set of latex cords, thereby providing their reliability and high dynamic characteristics.

BRIEF DESCRIPTION OF THE DRAWINGS

In order to provide further understanding of the claimed invention and its advantages, the following description offers an explanation of a possible implementation thereof with reference to the figures of the appended drawings, wherein identical reference numerals denote identical parts, and that illustrate the following:

MAIN DESIGNATIONS

1 the starting rail,
2 the sections of the starting rail,
3 the front support,
4 the rear support,
5 the carriage,
6 the elastic cords,
7 the rollers block,
8 a handle of the carriage for fixing the cords, 9 the rigging bar for fixing the cords,
10 a winch,
11 the hook of the release device,
12 the drive of the release device,
13 a lower bar of the carriage,
14 the first wheels of the carriage,
15 the second wheels of the carriage,
16 the third wheels of the carriage,
17 the inclined section of the starting rail,
18 the hole for the crank of the hook of the release device,
19 the carriage side plates,
20 the rod,
21 the crossbeam,
22 the exposed zones of the plates of the carriage,
23 the joint elements,
24 the UAV,
25 the UAV adapters,
26 the groove for receiving the fastener rod,
27 the joint hook,
28 the hinge for connecting the sections,
29 the external fastener,
30 the hinge for connecting the section to the rear support,
31 a fastener pin of the rear support,
32 the hinge of the front support,
33 a fastener pin of the front support,
34 the rope of the front support,
35 a telescopic extension of the front support.

The illustrative materials that explain the claimed invention and the disclosed specific exemplary embodiments do not limit the claimed scope of rights in any way, rather they only explain the essence of the invention.

IMPLEMENTATION OF THE INVENTION

Figure 1:
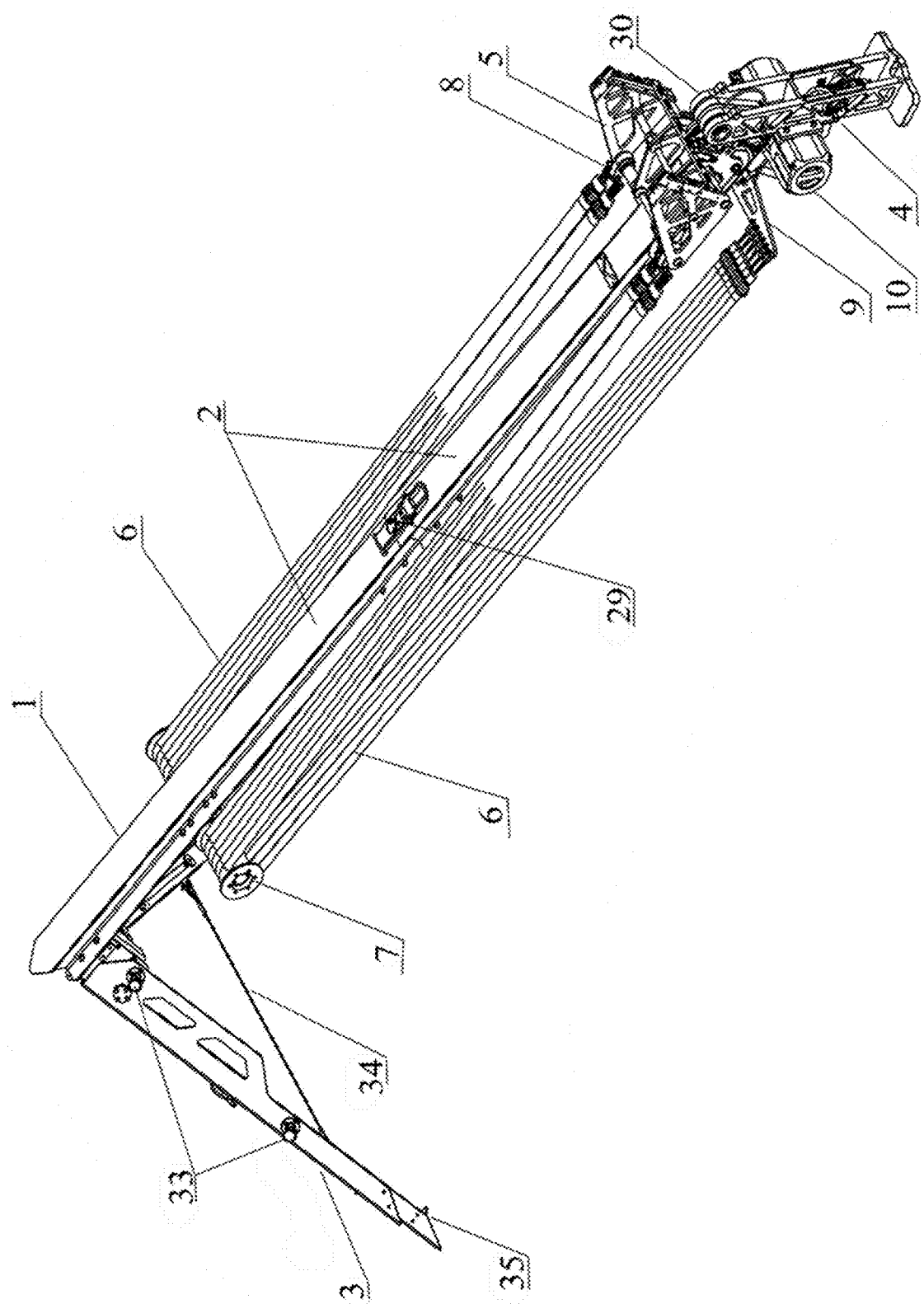
FIG. 1 illustrates a general axonometric view of the launcher.
Figure 2:
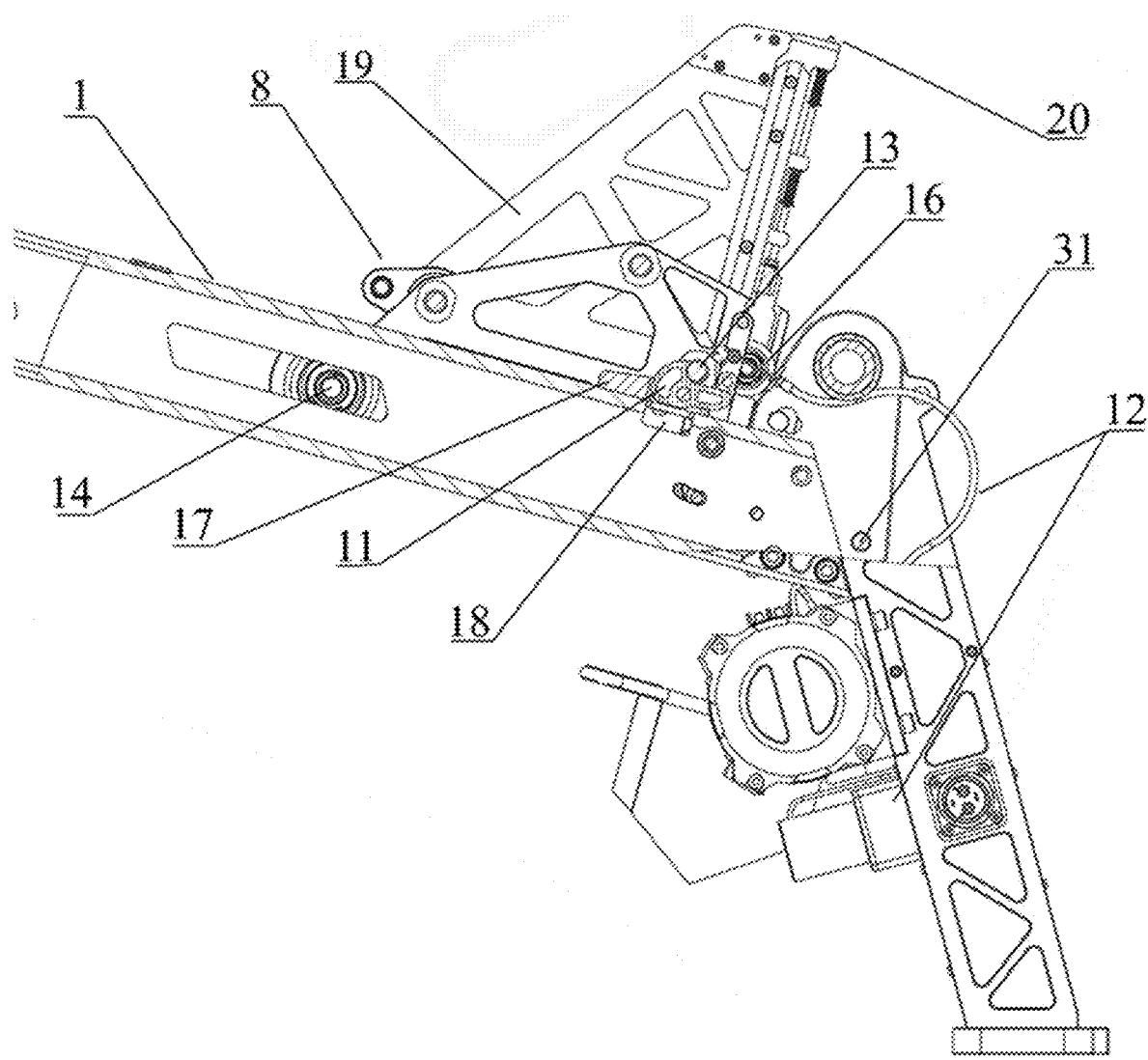
FIG. 2 illustrates a side partially cross-sectional view of the starting part of the launcher.
Figure 3:
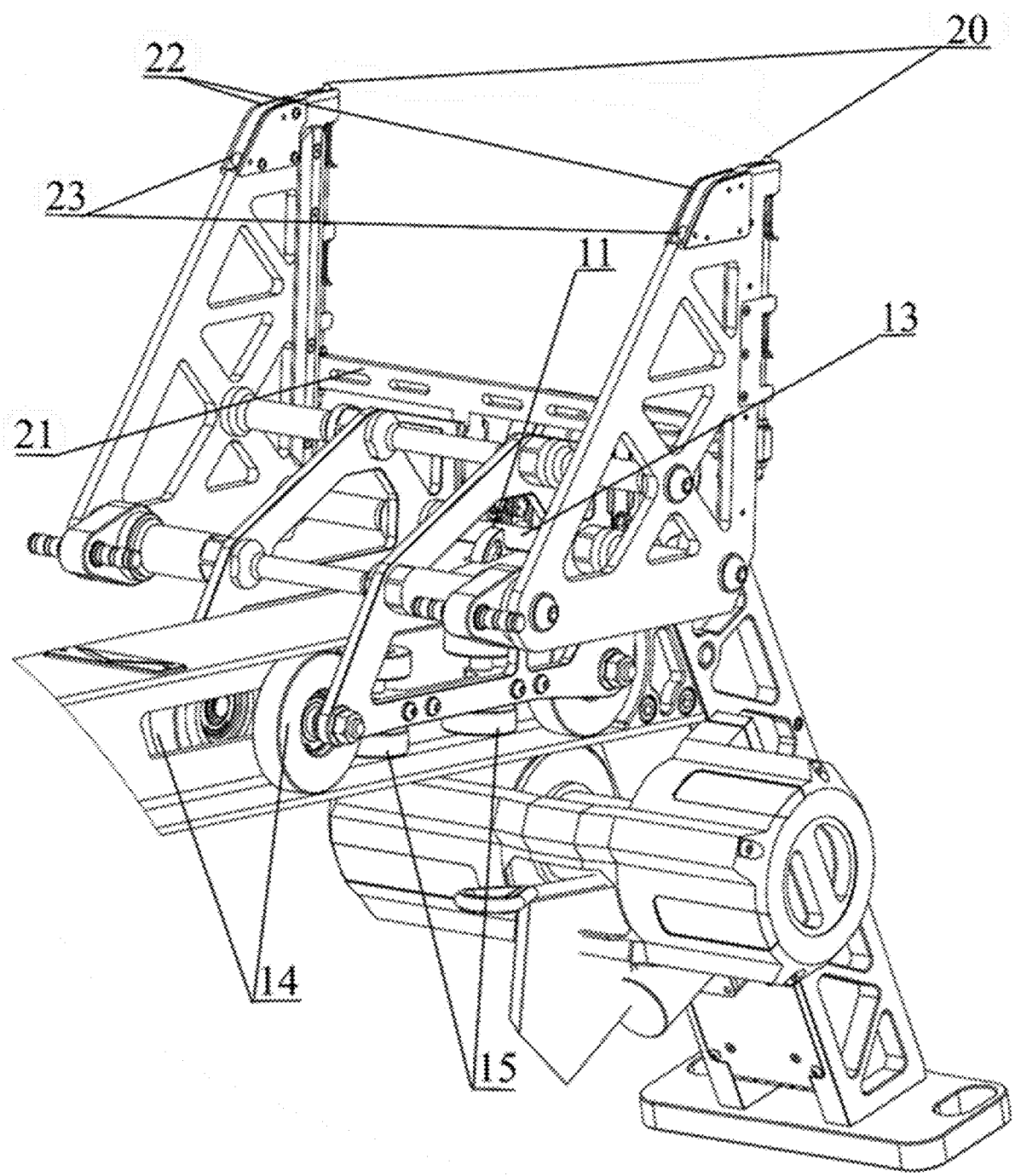
FIG. 3 illustrates an axonometric view of the starting part of the launcher.
Figure 4:
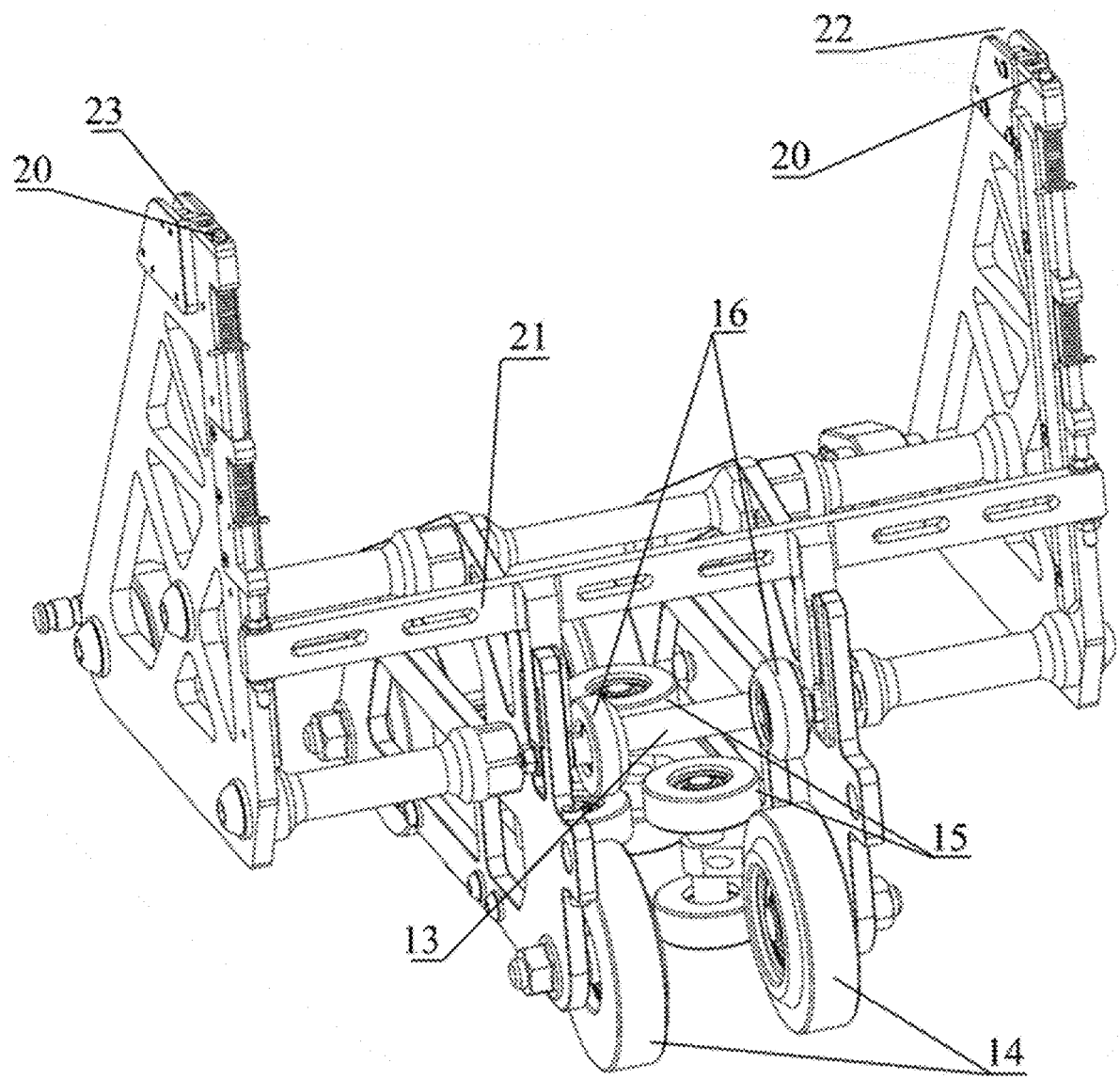
FIG. 4 shows a rear axonometric view of the carriage.

A catapult launcher comprises a starting rail (1) that is foldable from at least two sections (2), while a front support (3) and a rear support (4) are connected to the sections so as to be mutually foldable/unfoldable and height-adjustable and tilt angle, a carriage (5) that is mounted on the rail (1), elastic cords (6) that are fixed to the rail (1) and to the carriage (5), and a release device that interacts with the carriage (5). The elastic cords (6) are divided into two symmetrically arranged parts that pass along the starting rail (1), while passing around a rollers block (7) that are arranged on either side of the starting rail (1) at its end part. Certain ends of the elastic cords (6) are fixed on symmetrically spaced handles (8) that are provided on the carriage (5), while other ends are fixed on an underside of the starting rail (1) to a rigging bar (9) that is provided at a beginning of the rail (1). The release device that is connected to the rail (1) comprises a hook (11) and a hook drive (12), and the hook (11) is detachably connected to a bar (13) that is provided on the carriage rare part (5), thereby ensuring a reliable fixation of the carriage (5) at a starting position and a coordinated release impulse and a movement of the carriage (5) along the starting rail (1). An exemplary unfolded launcher is illustrated in FIG. 1, while an interaction assembly between the rail (1) and the carriage (5) is illustrated in detail in FIG. 2 and FIG. 3. Therewith, the connection of the carriage (5) to the starting rail (1) having an I-beam cross-section is ensured by three types of wheels that are illustrated in detail in FIG. 4 and FIG. 5. First wheels (14) and second wheels (15) have mutually perpendicular axes and ensure interaction between four pairs of the first wheels (14) of the carriage (5) and internal horizontal surfaces of the starting rail (1) that are formed by shelves of the I-beam cross-section, as well as interaction between two pairs of the second wheels (15) and surfaces of an internal side of the starting rail (1). A pair of third wheels (16) is mounted in the carriage rare part (5), while interacting with an upper surface of the starting rail (1), and fixed on vertically movable supports. The beginning of the starting rail (1), namely, its upper surface, is provided with a inclined section (17) that is provided with a hole (18), wherein the hook (11) of the release device lowers into the opening upon detachment from the lower bar (13) and the carriage (5) begins its movement along the starting rail under action of the elastic cords (6), and the pair of the third wheels (16) during their release from the inclined section (17) causes lowering of a crossbeam (21) with rods (20) fixed thereto, thereby unlocking the UAV on the carriage.

In order to ensure interaction with the UAV (24), the carriage (5) has two side plates (19) with fasteners in a form of two spring-loaded rods (20) provided therein, and free ends of the rods (20) are mounted vertically in upper parts of the side plates (19), while other ends are fixed in a crossbeam (21) that is arranged between the plates (19) of the carriage (5) and connected to supports of the wheels (16). Also, in order to ensure interaction with the UAV (24), the side plates (19) are partially made as exposed zones (22) that, together with a rollers pair that are mounted on transverse axes between edges of the specified zones, form joint elements (23) for the UAV (24).

Figure 5:
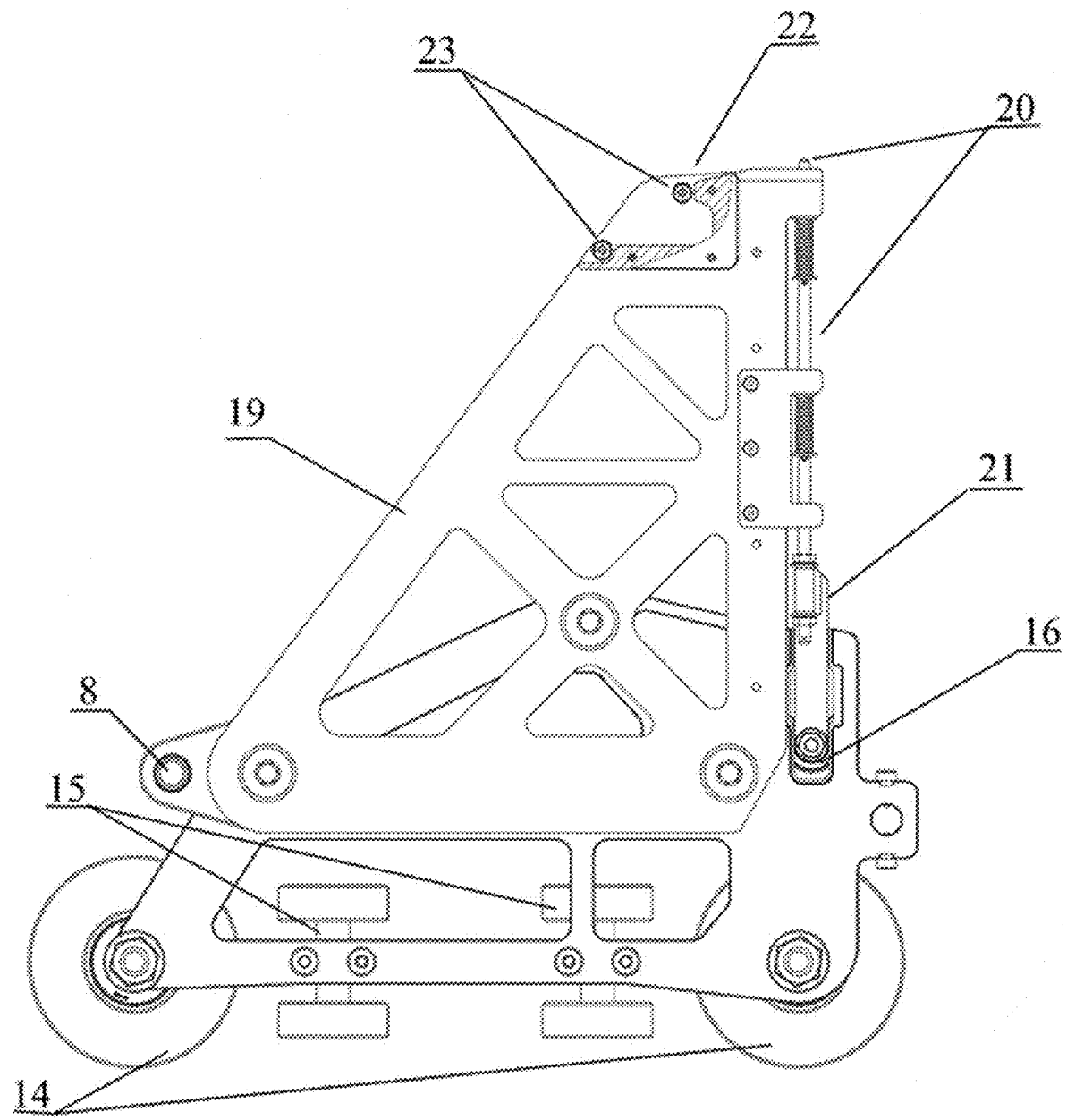
FIG. 5 illustrates a side partially cross-sectional view of the carriage.
Figure 6:
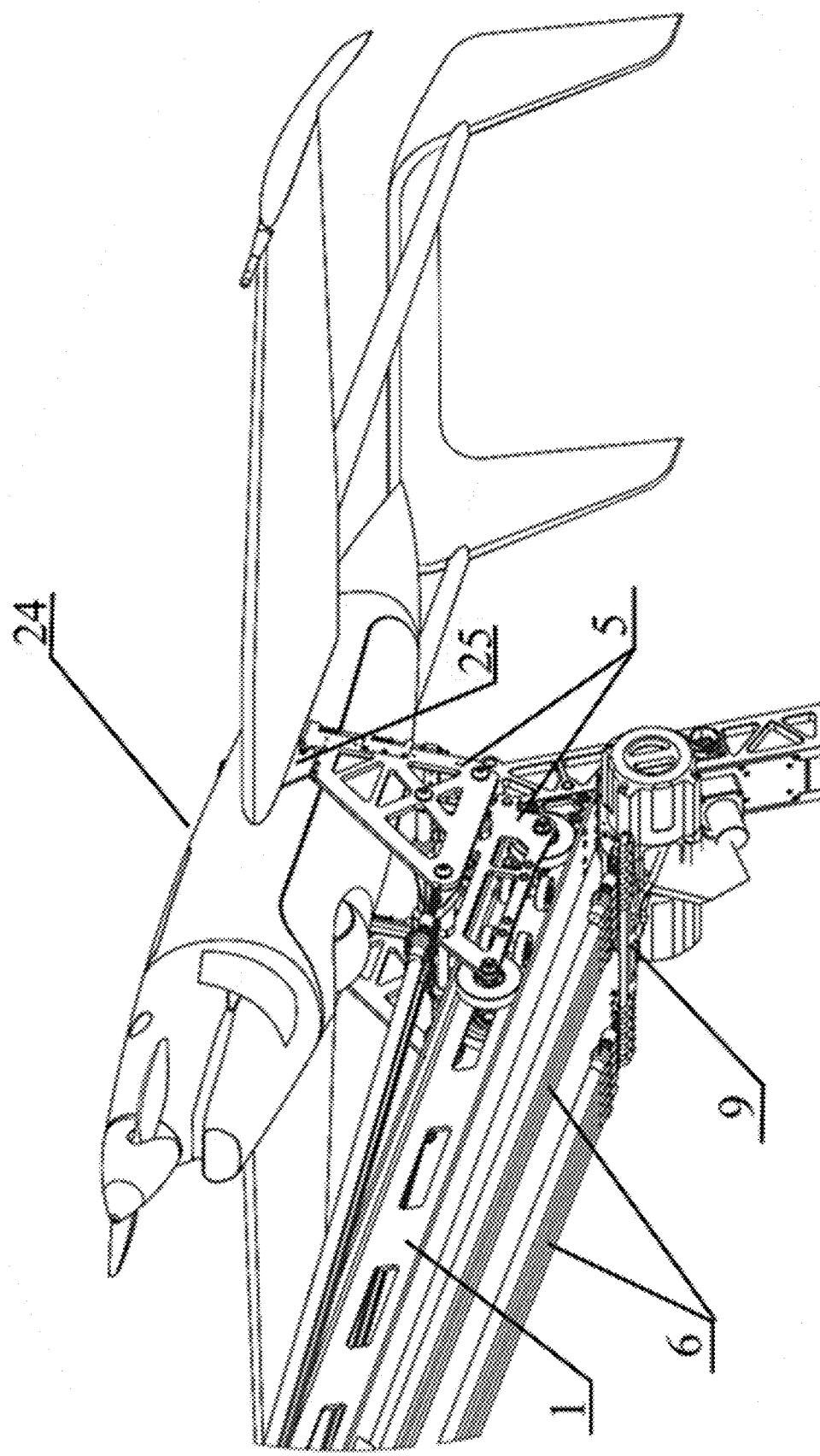
FIG. 6 illustrates a partial axonometric view of the launcher when it is coupled to the UAV at the start.
Figure 7:
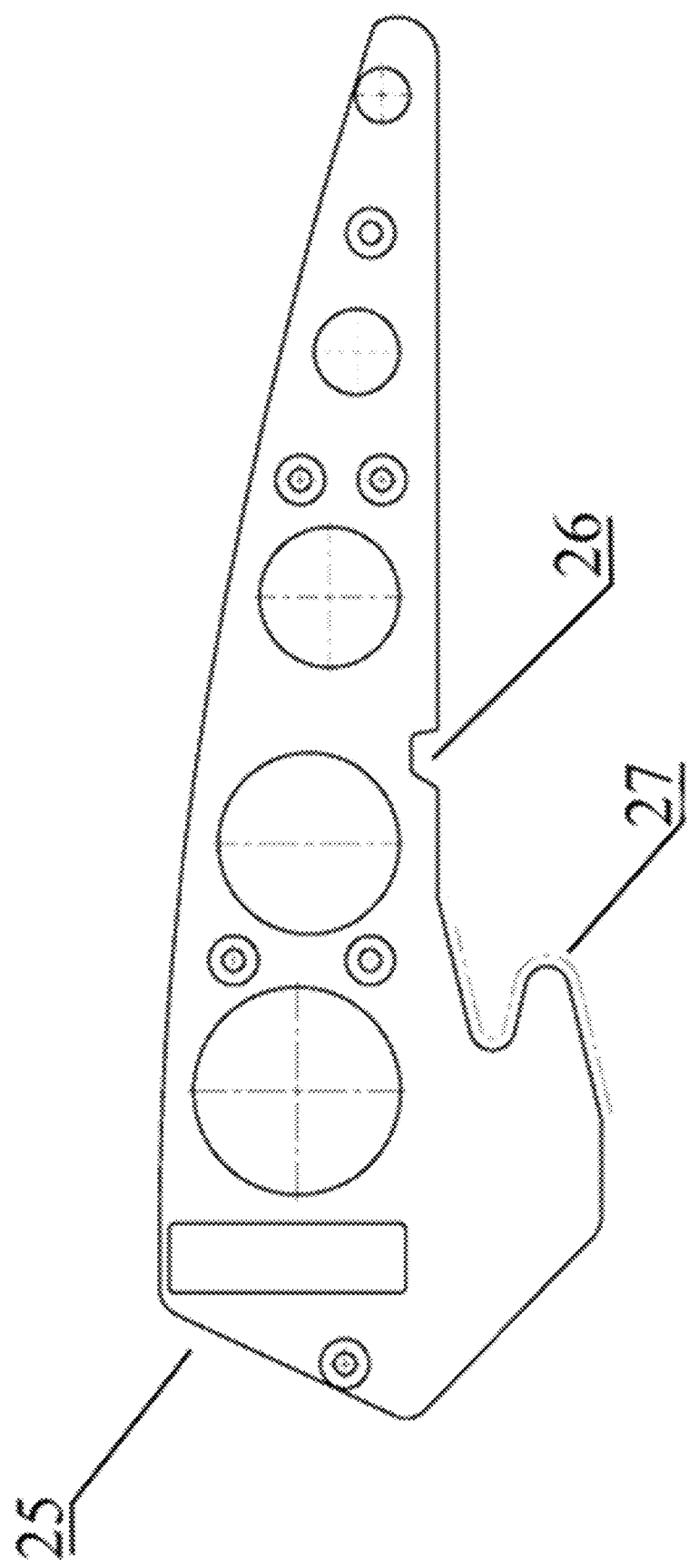
FIG. 7 illustrates the UAV adapter.

In order to ensure interaction with the rods (20) and with the joint elements (23) of the plates (19) of the carriage (5), two adapters (25) are symmetrically connected to the UAV's (24) fuselage, the adapters are made as plates that are illustrated in FIG. 7. A lower edge of each of the adapters (25) is provided with a groove (26) for receiving the fastener rod (20) and with a latch in a form of a hook (27) having an internal surface and an external surface that are tangential to the rollers of the joint elements (23). The specified adapters (25) may be fixed to the UAV's (24) fuselage, e.g., under the wing in locations between half-wings and the fuselage as illustrated in FIG. 5, however, they may be fixed in other locations of the fuselage depending on its modification, considering that the fixation location of the adapters must be coordinated with a UAV's (24) center of gravity. In order to facilitate and minimize an influence of the adapters (25) weight onto the UAV's (24) weight, they may be perforated, their length must be at least equal to a length of the upper parts of the plates (19), while their width gradually increases towards the hook, thereby enhancing their reliability during interaction with the carriage and avoiding any harmful influence onto the UAV (24) aerodynamics.

Figure 8:
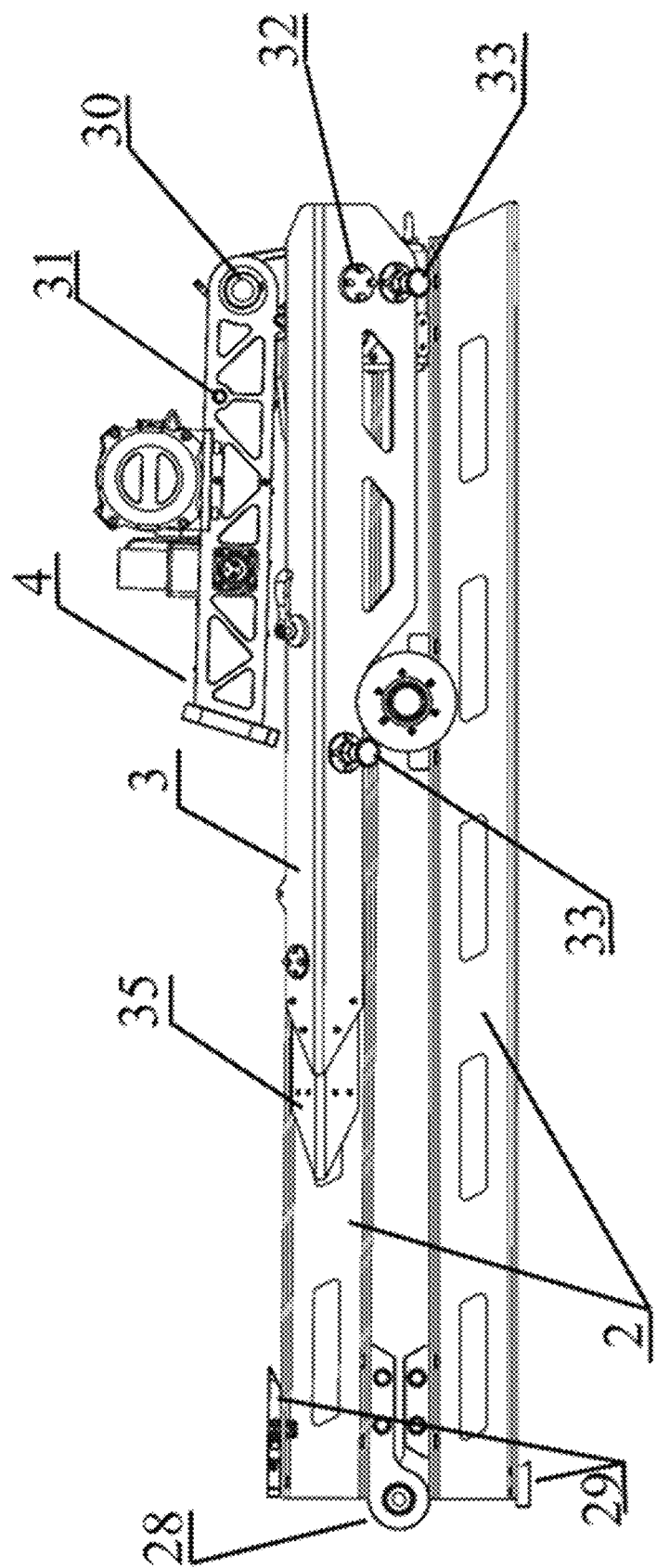
FIG. 8 illustrates the starting rail in the folded state.
Figure 9:
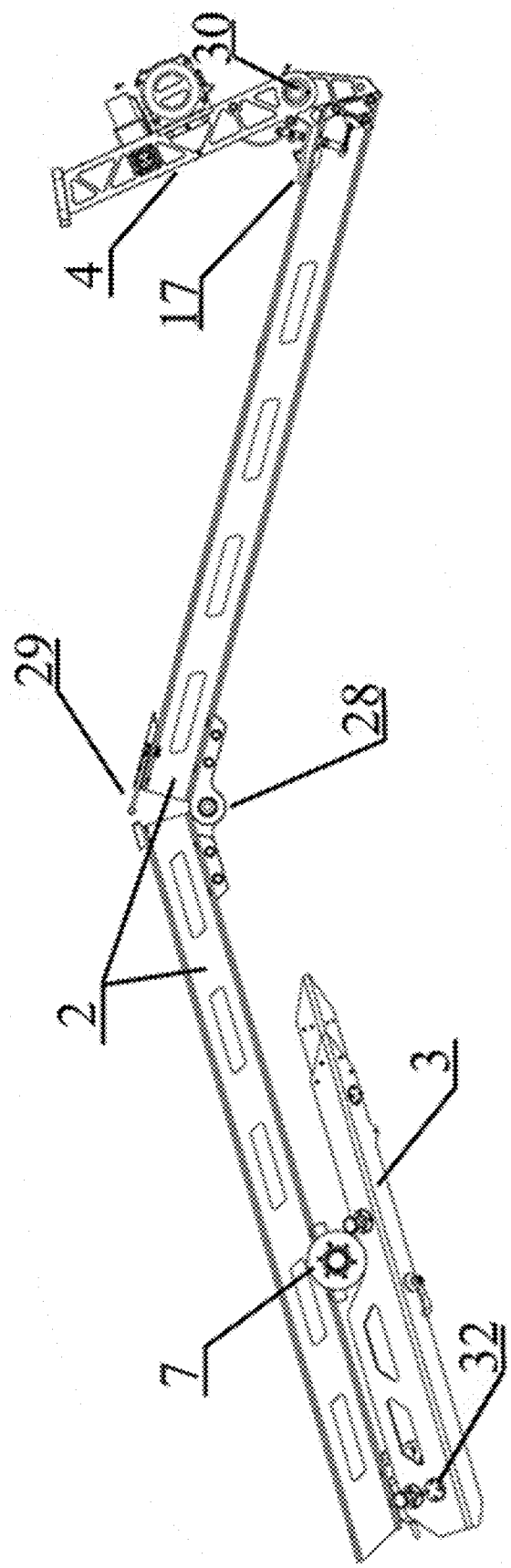
FIG. 9 illustrates the starting rail in a semi-folded state.

The launcher is delivered to a take-off location in its folded state as illustrated in FIG. 8 that is ensured by means of hinged connections (28, (30) and (32), by unfixing an external fastener (29) between the sections (2), and by fixing the supports (3) and (4) by means of metal fastening pins (31) and (33). In order to deploy the launcher, the sections (2) are rotated one relative to another one as illustrated in FIG. 9 that depicts the starting rail (1) in its semi-unfolded state by means of the hinged connection (28) until tight and the external fastener (29) is locked, then the fastener pin (31) is removed from the rear support (4) and the support is rotated around the axis that is common with the section (2) until tight, and it is again fixed by the fastener pin (31). Then, the fastener pin (33) is removed from the front support (3), it is lifted together with the section (2), while rotating it around the common axis, the front support (3) is unfolded that form a rest, and its legs are fixed by means of a metal rope (34). Also, the supports (3) and (4) may be fixed to the ground, e.g., by means of pins and tension ropes (not illustrated in the drawings). Mounting angles of the launcher are checked using a protractor and, if the angle must be corrected, telescopic extensions (35) of the front supports are used. The elastic cords (6) that are preferably a set of latex cords are fixed, and they also may be placed in a protective case to avoid damages, on the rigging bar (9) that is provided on the underside of the starting rail (1). The carriage (5) is manually mounted on the starting rail (1), while checking a free movement of the wheels (14), (15) and (16) along all guiding surfaces and eliminating irregularities and burrs, if any. The UAV's (24) fuselage is mounted on the side plates (19) of the carriage (5), while matching fixation elements (20) and (23) of the carriage (5) with the interaction elements (26) and (27) of the adapters (25), then the carriage (5) is brought to the tilted zone (17) of the starting rail (1) until junction between the hook (11) of the release device and the lower link (13) is achieved, thereby resulting in fixation of the carriage (5) on the launcher, and the UAV (24) is fixed on the carriage (5) due to triggering of the cords (20) and the movable crossbeam (21). Then, the elastic latex cords (6) are passed around the rollers block (7) on either side of the starting rail (1) and fixed on the symmetrically spaced handles (8) of the carriage that are rotatable around their own axes.

Figure 10:
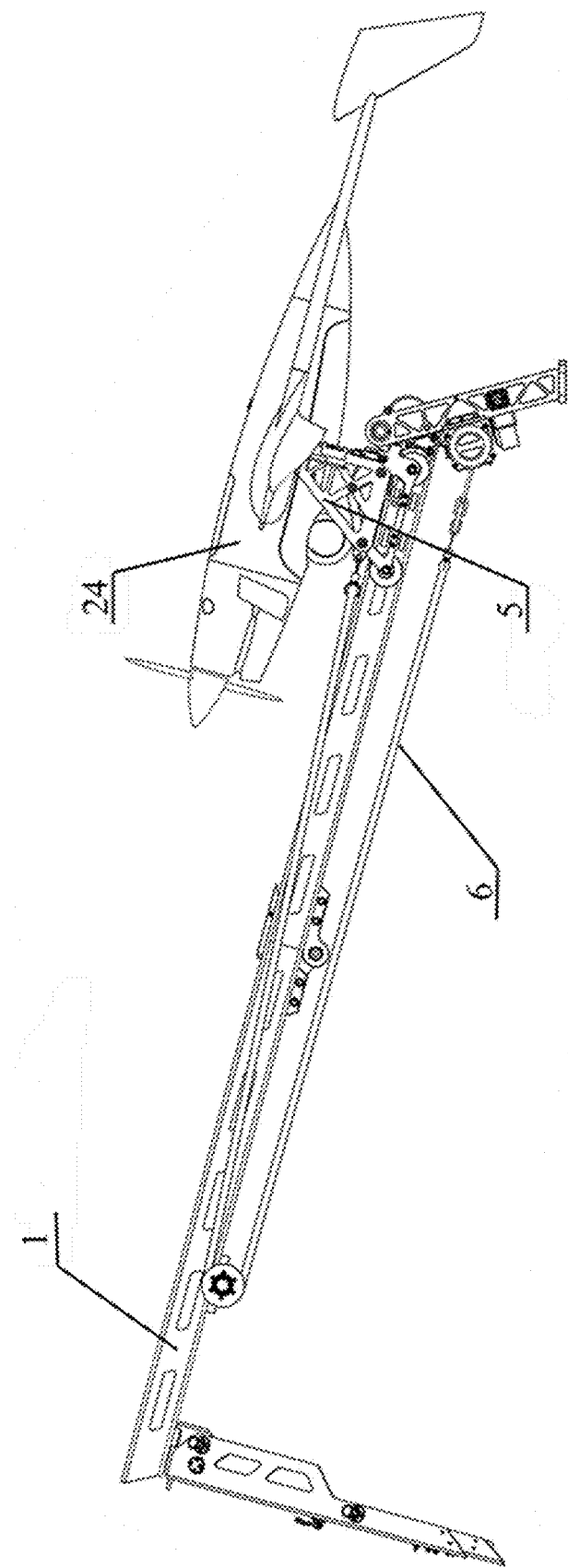
FIG. 10 illustrates a general view of the launcher when it is coupled to the UAV at the start.
Figure 11:
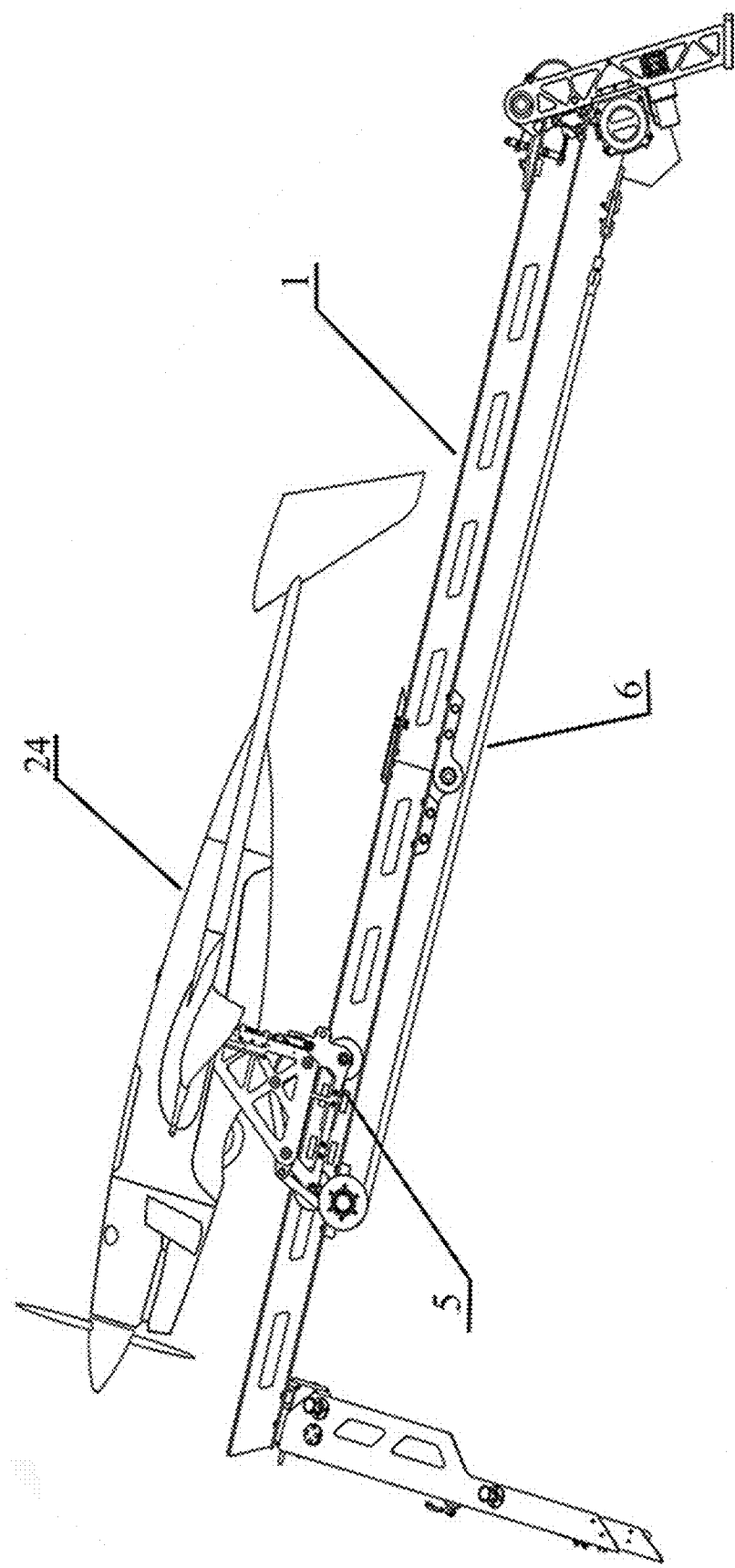
FIG. 11 illustrates a general view of the launcher when it is coupled to the UAV at the releasing step.

In order to launch the UAV (24), the elastic cords (6) are tensioned to reach a certain given tension parameter by means of an electrical or mechanical force, e.g., a winch (10) having a rope that is connected to the rigging bar (9), and the hook (11) of the release device is unlocked once the specified tension is reached. The carriage (5) begins to move along the starting rail (1), and during this movement, the pair of the wheels (16) in the carriage rare part (5) is released from the inclined section (17), and the bar (24) with the rods (20) fixed thereto is lowered, thereby releasing the rods (20) from the grooves (26) of the adapters (25). The carriage (5) with the UAV (24) mounted thereon is provided with an initial acceleration and movement due to the elastic, preferably, latex cords (6), and in order to provide an additional acceleration for a flight speed, a motor of the UAV (24) is activated prior to unlocking of the hook (11) of the release device. After the carriage (5) reaches its position of going beyond the rollers block (7), the dynamic power is loss and the elastic cords (6) start to act against the movement of the carriage (5), thereby slowing it down that causes a rollback of the carriage (5) upon rotation of the handles (8), and the hooks (27) of the adapters (25) of the UAV (24), under action of the inertial force, are released from the joint elements (23) and the UAV (24) continues its movement, while continuing to gain the speed. Therewith, the interaction of the surface of the hooks (27) of the adapters (25) tangentially to the rollers of the joint elements (23) ensures sliding, thereby avoiding biting of the plates of the adapters (25) during release of the UAV (24) from the side plates (19) of the carriage (5) and facilitates smooth launch. Steps of starting and releasing the UAV are illustrated in FIG. 10 and FIG. 11 that depict a general view of the catapult launcher when coupled to the UAV.

Trials in field conditions were conducted with the catapult launcher with implementation of all its features, while a set of these features of the claimed invention is provided in the claims. The trials were carried out on a small area without any prior preparation of the ground surface for installation. The deployed launcher that is adjusted by means of the front support with a pitch angle of the launcher set to 13-15±1° and with a roll of 0±0.5° has a length of not more than 3.5 m, while its height is not more than 2.0 m. In case of provision of the latex cords having a length of 1000-1200 mm with 3-3.5 times increase of the length upon maximum tension that are assembled with the carriage and the UAV mounted on the carriage, the smooth repeated take-off of the UAV was achieved with a take-off speed of 70±10 km/h, while ensuring a take-off angle of 10-15°. Therewith, dimensions of the launcher in its folded state include the length of less than 2.0 m, the width and the height of less than 0.5 m, thereby providing the portability and operational advantage of the launcher during transportation to a starting point using any vehicles or manually.

Therefore, the claimed launcher is portable, ensures sufficient starting impulse, avoids rolling and yawing of the UAV during acceleration, as well as ensures smooth release of the UAV at the end of the launcher starting rail.

The invention claimed is:

1. A catapult launcher for a fixed-wing unmanned aerial vehicle (UAV), the launcher comprises at least two sections that form a longitudinal starting rail that is mounted on supports, the rail is equipped with elastic cords and a release device, a carriage, which is linearly movable, is mounted on the longitudinal starting rail while interacting with the elastic pulling rods and the release device, and the carriage is equipped with a UAV interaction mechanism, wherein the longitudinal starting rail has an I-beam cross-section, four pairs of wheels are mounted in a carriage lower part and configured to interact with vertical surfaces of the longitudinal starting rail, and two pairs of wheels are configured to interact with internal horizontal surfaces of the longitudinal starting rail, another pair of wheels that is configured to interact with an external surface of the longitudinal starting rail is mounted in a carriage rear part, the carriage has two side plates with the UAV interaction mechanism provided in the carriage, the interaction mechanism comprises fasteners in a form of two spring-loaded rods having free ends that are mounted vertically in an upper part of the side plates and other ends that are fixed in a crossbeam that is arranged between the carriage side plates and connected to wheels supports of the carriage rear part that are movable vertically, and joint elements that are arranged in upper exposed zones of the plates and comprise rollers pairs that are mounted on the crossbeam, and adapters are fixed on a UAV's fuselage, the adapters are made in a form of two plates, a lower edge of each of the plates is produced with a groove so as to enable interaction with the rod and a detent in a form of a hook having an internal surface and an external surface that are tangent during interaction with the rollers of the joint elements; a beginning of the longitudinal starting rail is provided with an inclined section that is beveled in a launching direction, the inclined section is provided with a hole, and the release device comprises a hook that is configured to detachably interact with the carriage lower part and to crank into the hole of the inclined section, the elastic cords are symmetrically arranged along the longitudinal starting rail, while passing around roller blocks on sides of the longitudinal starting rail, and fixed, with cord first ends, on a carriage front part and fixed, with cord second ends, to a rigging bar that is provided on an underside at the beginning of the longitudinal starting rail.

2. The launcher according to claim 1, wherein the launcher comprises nodal connections for connecting the at least two sections between each other and for connecting the at least two sections to the supports that are equipped with external fasteners to provide a hinged folding/unfolding and adjustment of positions of the supports relative to the at least two sections.

3. The launcher according to claim 1, wherein a front support is V-shaped and height-adjustable.

4. The launcher according to claim 1, wherein the adapters plates are perforated, their length is at least the same as a length of the carriage plates, while a width of each of the adapters plates gradually increases towards the hook.

5. The launcher according to claim 1, wherein the release device comprises an electrical drive.

6. The launcher according to claim 1, wherein the elastic pulling rods are a set of latex cords.

7. The launcher according to claim 1, wherein the release device comprises a mechanical drive.

* * * * *